United States Patent [19]
Sekita et al.

[11] Patent Number: 5,921,578
[45] Date of Patent: Jul. 13, 1999

[54] BODY FRAME ASSEMBLY IN A SMALL-SIZED VEHICLE

[75] Inventors: Takahito Sekita; Kiyotaka Fujihara; Masao Ogawa, all of Saitama, Japan

[73] Assignee: Honda Giken Kogyo Kabushiki Kaisha, Tokyo, Japan

[21] Appl. No.: 08/844,955

[22] Filed: Apr. 23, 1997

[30] Foreign Application Priority Data

Apr. 23, 1996 [JP] Japan .................................. 8-101725

[51] Int. Cl.⁶ ...................................................... B62D 21/11
[52] U.S. Cl. ........................ 280/788; 280/781; 280/784; 296/203.02; 296/901
[58] Field of Search ................................. 280/781, 782, 280/784, 788, 124.128; 296/901, 194, 204, 205, 203.02

[56] References Cited

U.S. PATENT DOCUMENTS 2,551,982  5/1951  Verkins .
4,869,539  9/1989  Cassese ................................. 280/781

FOREIGN PATENT DOCUMENTS

| 440852 | 9/1973 | Australia . |
| 0659631A1 | 6/1995 | European Pat. Off. . |
| 1279397 | 11/1960 | France . |
| 2464871 | 3/1981 | France . |
| 2670737 | 6/1992 | France . |
| A-2 63978 | 4/1990 | Japan . |
| A-6247338 | 9/1994 | Japan . |
| 378482 | 7/1932 | United Kingdom ................... 280/788 |

*Primary Examiner*—Eric D. Culbreth
*Attorney, Agent, or Firm*—Birch, Stewart, Kolasch & Birch, LLP

[57] ABSTRACT

A shock absorbing stroke in the front portion of a vehicle body is to be made large. Between right and left front wheels are disposed longitudinally extending side beams and center beam, and these three beams are integrally connected by connecting members in front of a cross member. A shock dispersing plate is attached to the said integral connection and the back thereof is brought into abutment with a floor portion formed of a resin.

14 Claims, 7 Drawing Sheets

BODY FRAME ASSEMBLY IN A SMALL-SIZED VEHICLE

BACKGROUND OF THE INVENTION

1. Field of the Invention

The present invention relates to a small-sized one-passenger or two-passenger vehicle suitable for operation on city streets.

2. Description of Background Art

In Japanese Patent Laid Open No. 63978/90 there is disclosed a shock absorbing structure wherein longitudinal side beams, including a generally U-shaped shock absorbing member, project horizontally in parallel with each other in a front portion of a vehicular body.

In Japanese Patent Laid Open No. 247338/94 it is disclosed that a deformation of a bonnet is also concerned in the absorption of a shock, in addition to the above shock absorbing structure.

Since the above U-shaped shock absorbing member is disposed horizontally, the side beams are apt to bend vertically at the time of absorbing a shock. Therefore, it is impossible to use sufficiently long side beams and hence impossible to ensure a sufficient deformation stroke (shock absorbing stroke) for the absorption of a shock. Thus, a limitation is encountered in the absorption of shock energy.

Further, in the above shock absorbing structure in which an upper structure of the vehicle body such as the bonnet is concerned in the absorption of shock, it is necessary that a deformation balance of all related components be taken into account. Thus, it is difficult to optimize the shock absorption characteristic.

SUMMARY AND OBJECTS OF THE INVENTION

According to the present invention, in order to solve the above-mentioned problems, there is provided a body frame assembly in a small-sized vehicle having a shock absorbing portion projecting forward from a main frame which supports the body of the small-sized vehicle, the shock absorbing portion including a plurality of side beams projecting forwardly in parallel with each other from the front end of the main frame, the side beams being connected at the respective front ends to a common front-end cross member. A center beam is connected at the front end thereof to a nearly central part of the cross member. The rear end of the center beam is located at a higher position than the side beams. Connecting members are provided for connection between the center beam and the side beams.

The shock absorbing portion may further include a plate member for covering the rear end of the center beam and part of the connecting members from a passenger compartment side. Further, the back of the plate member may be brought into abutment with a resinous floor of the vehicle body.

The shock absorbing portion includes a plurality of longitudinal, parallel side beams connected at the respective front ends to a common front-end cross member and a center beam connected at the front end thereof to the cross member. The rear end of the center beam is located at a higher position than the side beams and is connected to the side beams through connecting members.

Thus, the constituents of the shock absorbing portion form a triangular shape in a side view, so can be deformed without vertical bend at the time of absorbing a shock. Consequently, it is possible to ensure a sufficiently long shock absorbing stroke.

Since it is not necessary for an upper structure of the vehicle body such as the bonnet to take part in the absorption of a shock, it is sufficient to take into account only a deformation balance of a reduced number of components, and therefore it is easy to optimize the shock absorption characteristic.

As to the number of side beams, it is preferable that a pair of right and left side beams be provided. However, three or more side beams may be utilized.

Further, the provision of a plate member which covers the rear end of the center beam and part of the connecting members from the passenger compartment side is advantageous in that it is possible to reduce an abutment pressure upon abutment of those portions against the vehicle body side at the time of absorbing a shock.

Therefore, if the said plate member is brought into abutment with the floor portion of the passenger compartment, wherein the floor portion is made of a resin, shock energy can be dispersed and absorbed by the resinous vehicle body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
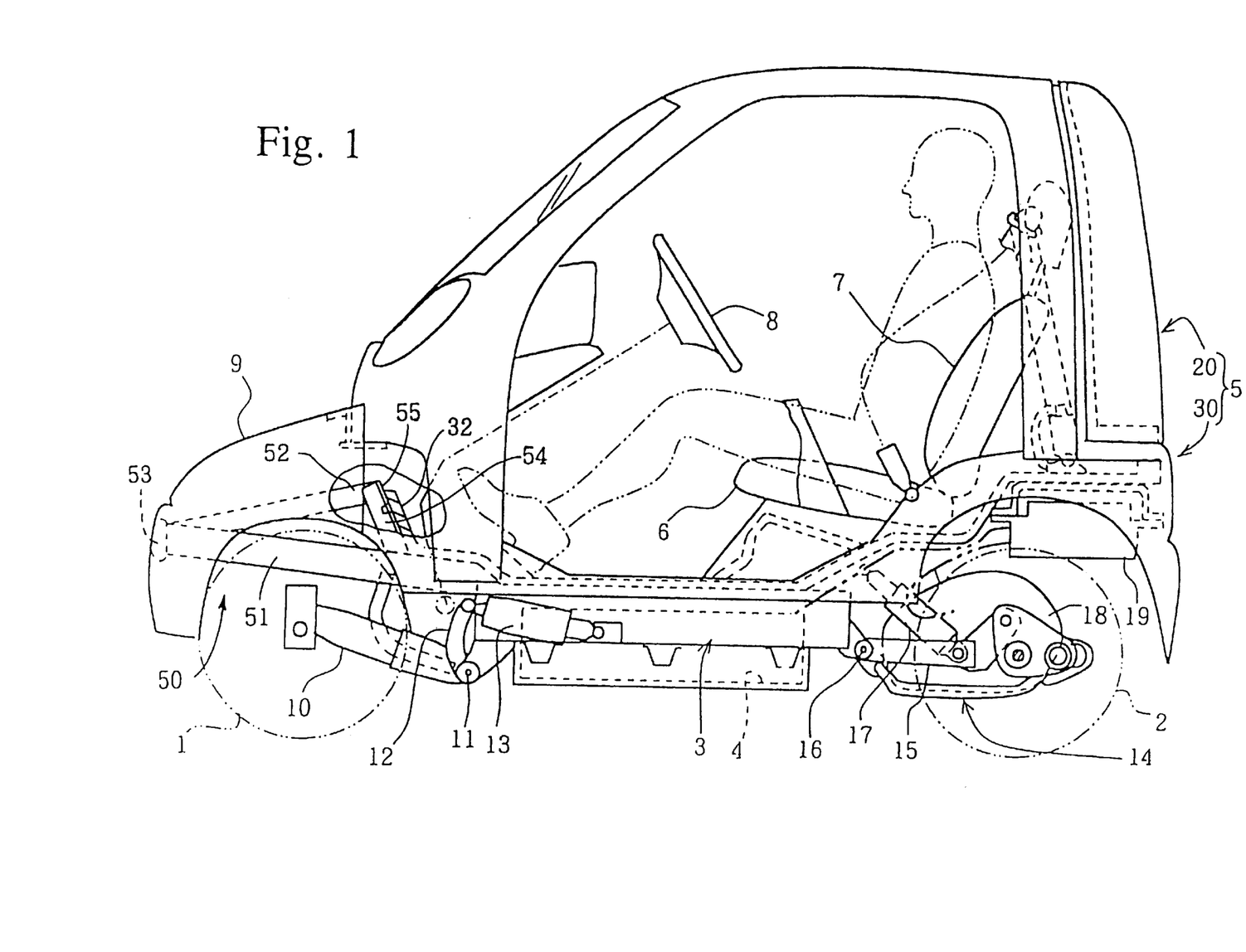
FIG. 1 is a side elevational view of a small-sized vehicle.

In a small-sized vehicle, as shown in FIG. 1, a battery 4 is supported by a vehicle body frame 3 disposed between a pair of right and left front wheels 1 and a pair of right and left rear wheels 2. A vehicle body 5 includes upper and lower portions of an integral structure which are supported on the vehicle body frame 3. The vehicle body 5 includes a passenger compartment.

Large openings are formed in the right and left side faces of the vehicle body 5. A passenger compartment is defined inside the vehicle body 5. A seat cushion 6 and a seat back 7 are provided in the interior of the passenger compartment with a steering wheel 8 being disposed in front of the seat cushion and the seat back. The front portion of the vehicle body 5 is covered with a detachable front fender 9.

The front wheels 1 are supported in front of the vehicle body frame 3 and are pivotably mounted about pivot points 11 through a pair of right and left leading arms 10.

From a position close to the pivot point 11 of each leading arm 10 an upwardly projecting front arm 12 is formed. A front shock absorber 13 is mounted between the front arm 12 and a side face of the vehicle body frame 3.

The rear wheels 2 are supported by the rear portion of the vehicle body frame 3 pivotably about pivot points 16 through a pair of right and left trailing arms 15, with rear shock absorbers 17 being mounted between the trailing arms 15 and the rear end portion of the vehicle body frame 3.

The trailing arms 15, together with a power portion 18 provided over the trailing arms 15 and having an electric motor, constitute a vertically swingable power unit 14.

A control unit 19 is suspended from the rear portion of the vehicle body 5 which is located above the power portion 18. The control unit 19 is a known control unit which comprises a microcomputer for example to control the output of the electric motor in the power portion 18.

Figure 2:
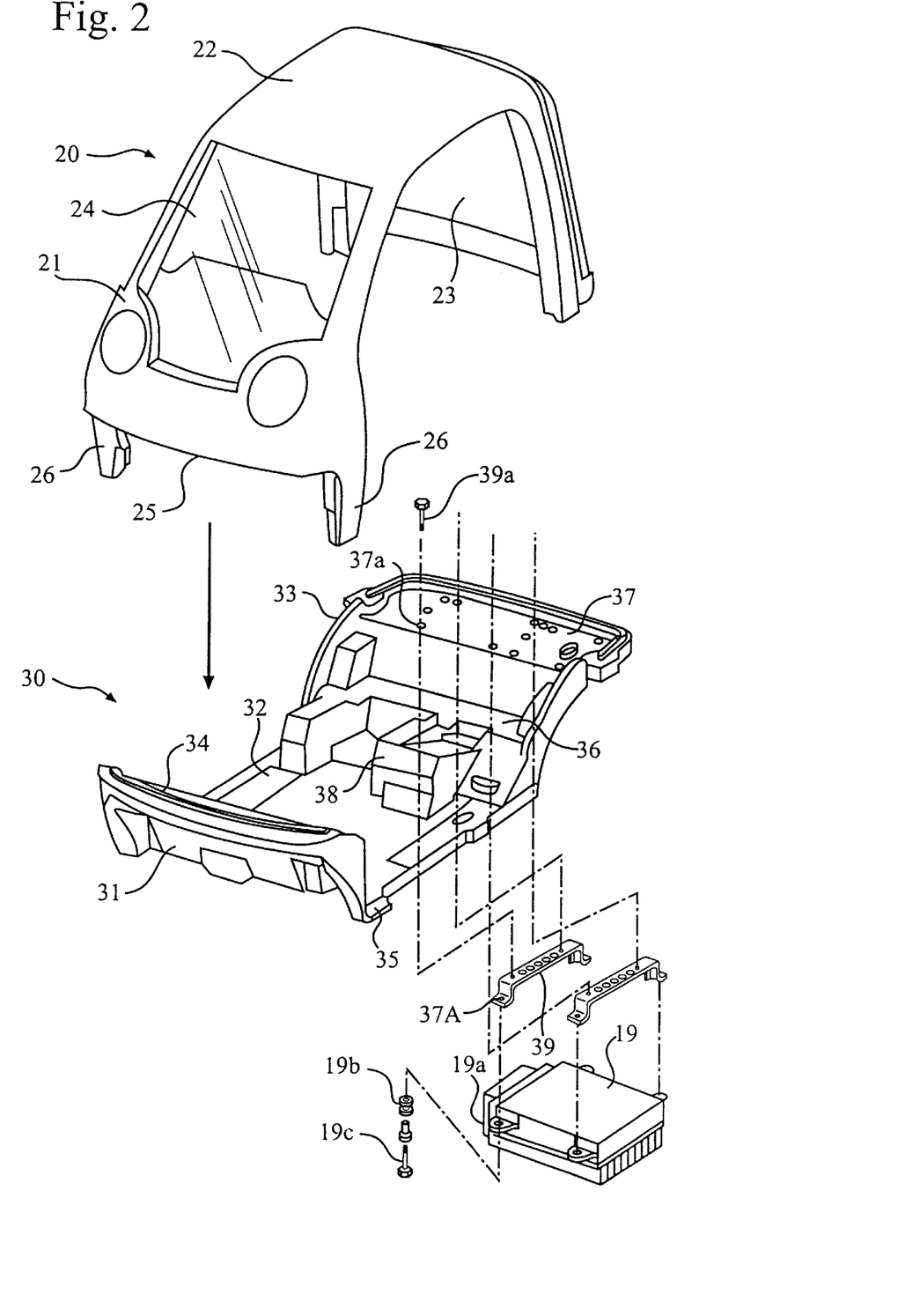
FIG. 2 is an exploded view thereof.

As shown in FIG. 2, the vehicle body 5 is a resinous body comprising an upper cabin 20 and a lower cabin 30 which are vertically combined together.

The upper cabin 20 comprises a front portion 21, a roof portion 22 and a rear portion 23 and is arch-shaped in a side view. The roof portion 22 and the rear portion 23 are each formed in the shape of a panel.

In the front portion 21 is formed a window 24 with a glass plate fitted therein. Mounting portions 26 extend downwardly from both right and left sides of a lower edge 25 of the front portion 21.

The lower cabin 30 includes a front portion 31, a floor portion 32 and a rear extending portion 33. The front portion 31 rises forwardly and is bonded at its upper edge 34 to the lower edge 25 of the front portion of the upper cabin.

Recesses 35 are formed in the floor portion 32 at positions close to the base portion of the front portion 31 of the lower cabin. The mounting portions 26 of the upper cabin are brought into abutment with the recesses 35 and bonded thereto.

The rear extending portion 33 includes an inclined portion 36 as a front half portion rising obliquely backwardly in side view and an overhanging portion 37 extending backwardly substantially horizontally from the upper end of the inclined portion 36.

The floor portion 32 is a portion which is placed on and supported by the vehicle body frame 3. From its rear portion up to the inclined portion 36 a seat mounting portion 38 projects integrally, and the seat cushion 6 is mounted thereto.

Mounting holes 37a are formed in the overhanging portion 37, and bolts 39a are inserted through the mounting holes 37a from above. With the bolts 39a, suspending strips 39 are attached to the underside of the overhanging portion 37.

Mounting holes 37A are formed in both ends of each suspending strip 39, while mounting lugs 19a are formed on side faces of the control unit 19. The mounting lugs 19a are brought into engagement with the mounting holes 37a and fixed with bolts 19c through a vibration-proof rubber member 19b, whereby the control unit 19 is mounted.

Figure 3:
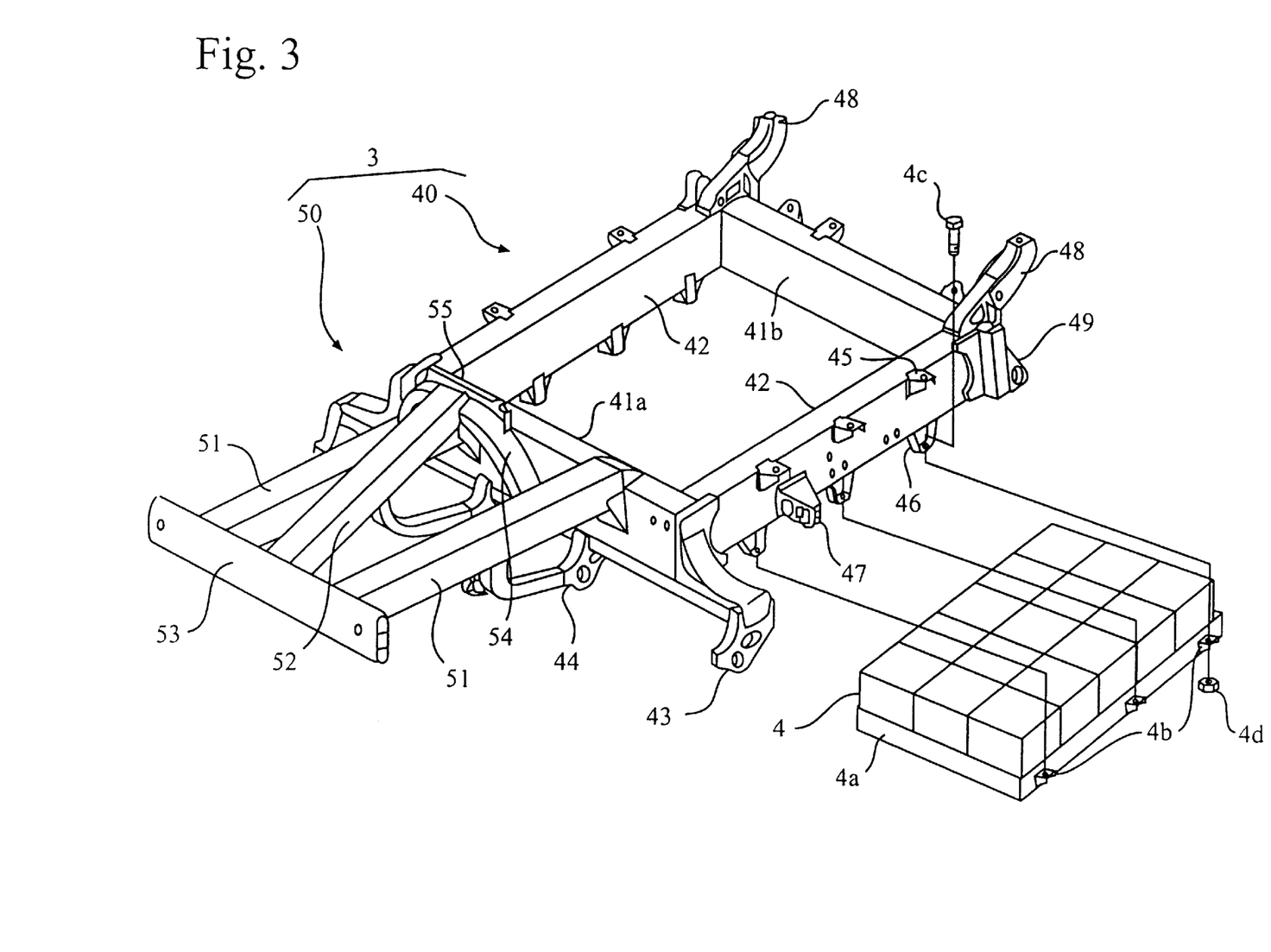
FIG. 3 is a perspective view of the body frame portion.

As shown in FIG. 3, the vehicle body frame 3 has a rectangular frame portion 40 formed in a generally quadrilateral shape using a high-rigidity metal such as a square aluminum pipe for example and a shock absorbing portion 50 formed in front of the rectangular frame portion 40.

The rectangular frame portion 40 is formed in a generally quadrilateral shape using front and rear cross members 41a, 41b and both side members 42. Pivot supporting arms 43 project obliquely, downwardly from both right and left ends of the cross member 41a. At the middle portion of the cross member 41a a pair of pivot supporting arms 44 are provided.

The right and left side members 42 are each provided at the upper portion thereof with stays 45 for mounting the lower cabin 30 and at the lower portion thereof with stays 46 for supporting the battery. Further, a shock absorber bracket 47 for supporting the rear end portion of the front shock absorber 13 is attached to the outer side face of each side member 42 at an intermediate position.

The battery 4 is placed on a tray 4a which is received in the rectangular space of the rectangular frame portion 40, then mounting lugs 4b, formed on side faces of the tray 4a, are superposed on the stays 46 and fixed with bolts 4c and nuts 4d.

Shock absorber brackets 48, projecting backwardly and obliquely upwardly, are provided at both right and left ends of the upper portion of the cross member 41b, and also from both right and left ends of the lower portion of the cross member 41b stays 49 project backwardly and obliquely downwardly.

The shock absorbing portion 50 has a pair of right and left side beams 51 extending forwardly and obliquely upwardly from both end portions of the cross member 41a and also has a center beam 52 located intermediate between and in parallel with the side beams 51 and extending backwardly and obliquely upwardly.

The front ends of the extending portions of the pivot supporting arms 44 are attached respectively to side faces of the intermediate portions of the right and left side beams 51.

The front ends of the side beams 51 and the center beam 52 are mounted to a bumper 53, while the rear end of the center beam 52 is supported by connecting members 54 extending in a curved vertical direction from the right and left side beams 51.

A single, generally semicircular, shock dispersing plate 55 is attached onto the connection between the rear end of the center beam 52 and the right and left connecting members 54.

Figure 4:
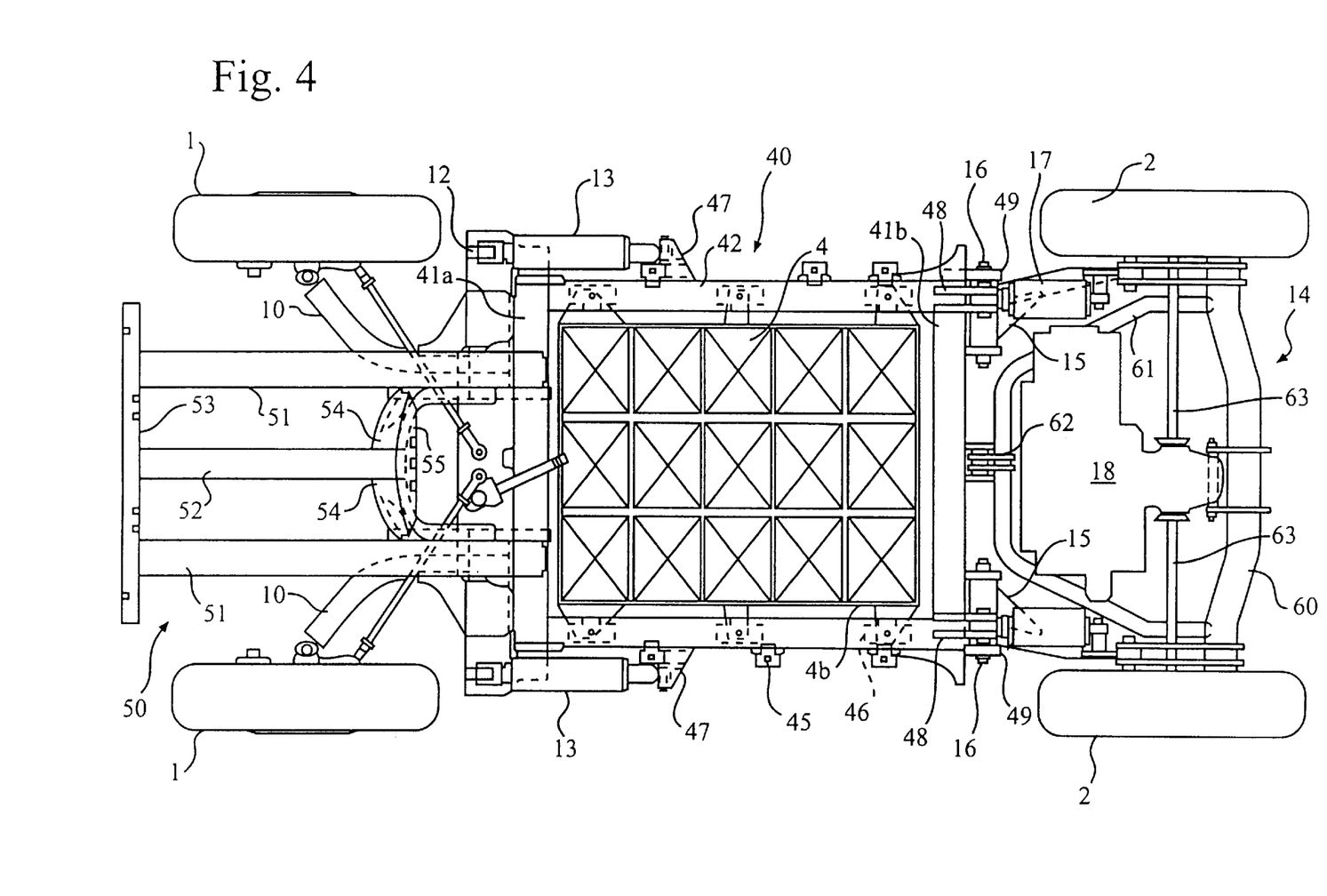
FIG. 4 is a plan view showing a vehicle body frame and front and rear wheel suspension structures.
Figure 5:
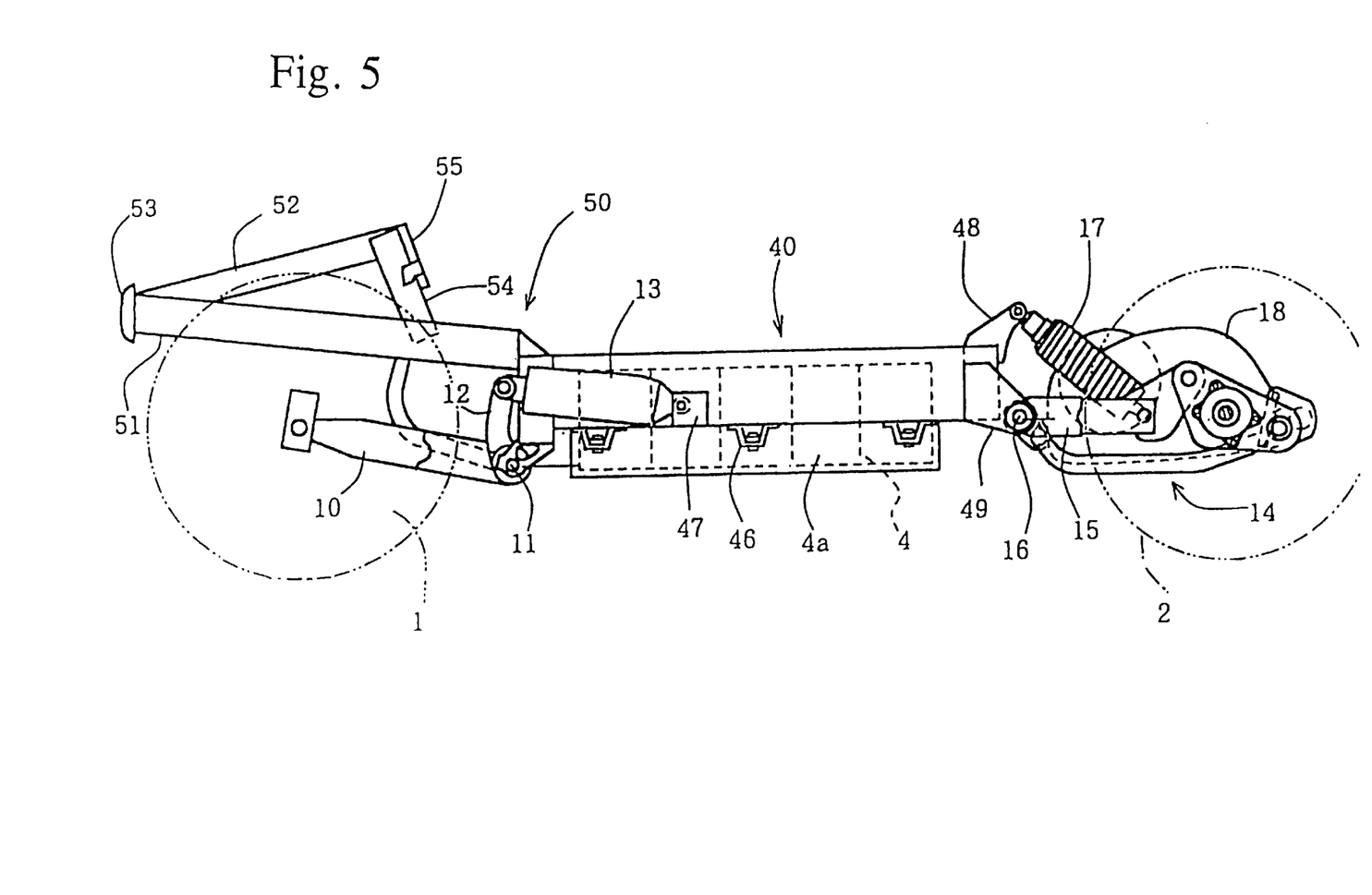
FIG. 5 is a side elevational view thereof.

In the front wheel suspension, as is seen from FIGS. 4 and 5, the rear end portion of each leading arm 10 is pivotally supported between a set of adjacent pivot supporting arms 43 and 44.

In the rear wheel suspension, the front ends of the rear shock absorbers 17 are mounted to the projecting ends of the shock absorber brackets 48 on the cross member 41b and are supported thereby.

Further, the front end portions of the trailing arms 15 are pivotally supported by the lower stays 49, the center of each such pivotal support being a pivot point 16.

The swing power unit 14 is provided with a cross pipe 60 which connects the rear ends of the right and left trailing arms 15 and a lower pipe 61 which supports the bottom of the power portion 18. The lower pipe 61 is supported at the center of its front portion by the cross member 41b coaxially with the pivot points 16.

The right and left rear wheels 2 are rotated through axles 63 which are rotated by the power portion 18.

Figure 6:
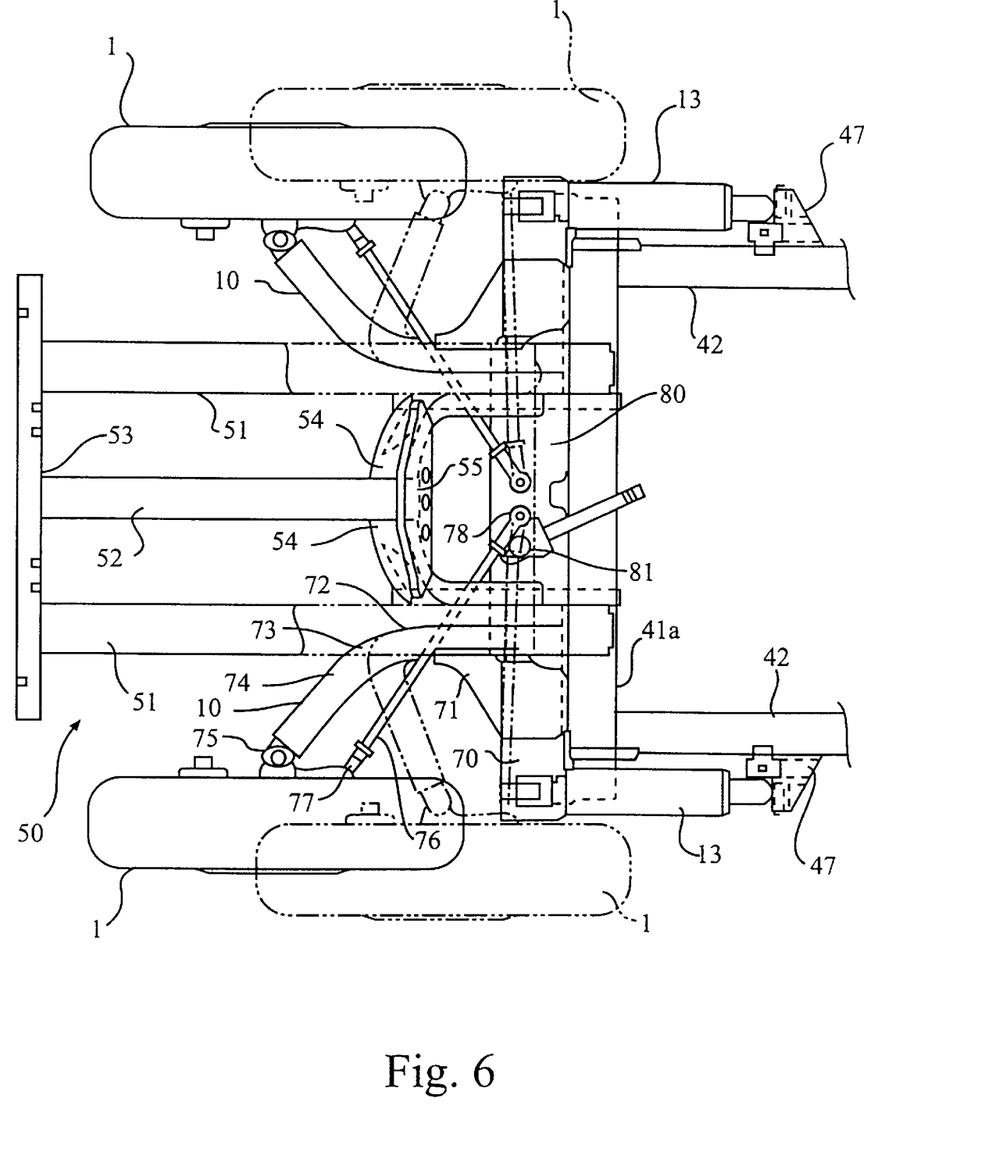
FIG. 6 is a plan view of a front wheel suspension system portion.
Figure 7:
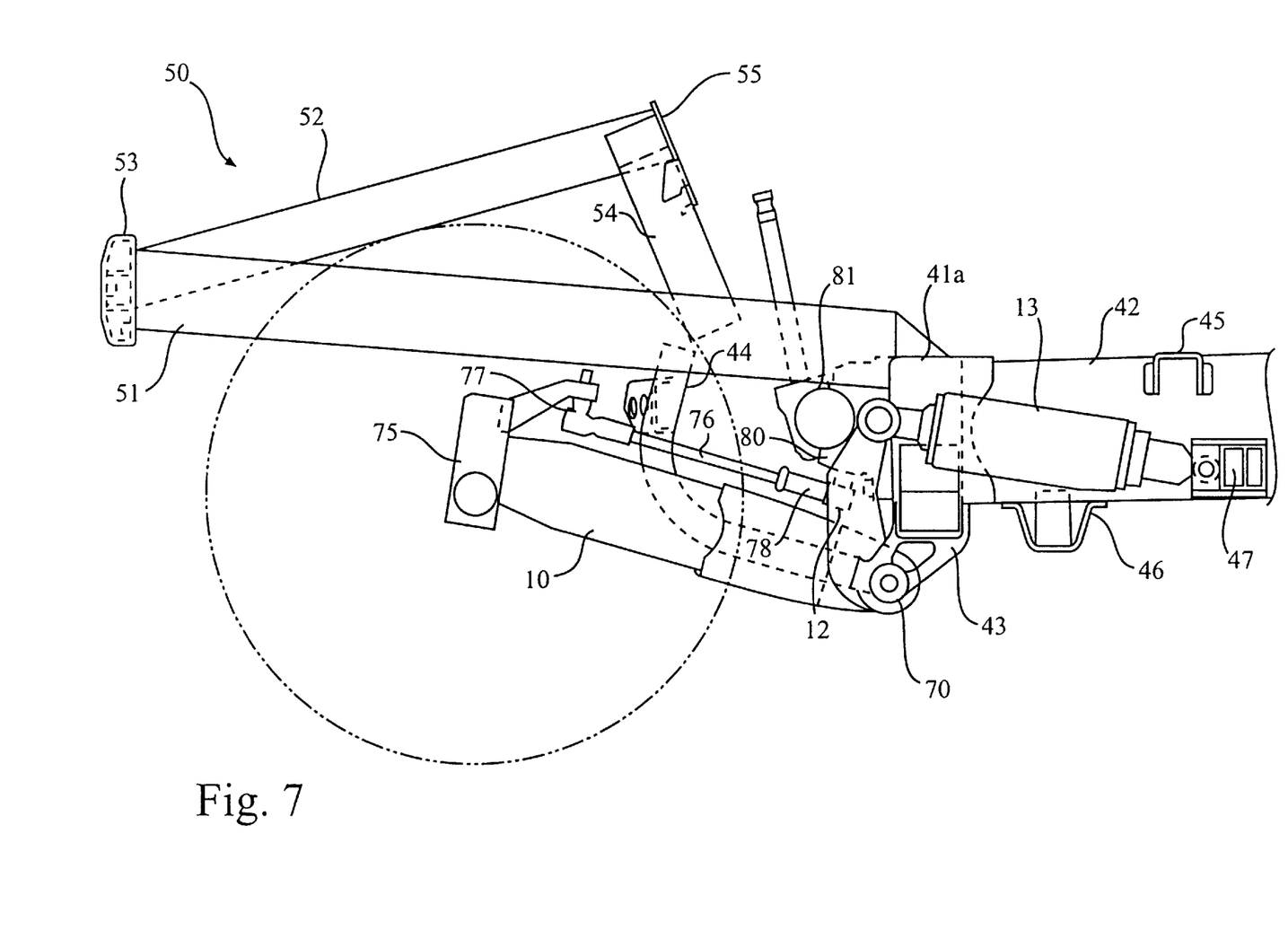
FIG. 7 is a side view of FIG. 6.

FIG. 6 is a plan view of a front wheel suspension system portion and FIG. 7 is a side view thereof. As is seen from these figures, a pivot shaft 70 disposed at the rear end of each leading arm 10 is supported pivotably between the outside pivot supporting arms 43 and the inside pivot supporting arm 44.

The connection between the pivot shaft 70 and the leading arm 10 is reinforced by a gusset 71.

Above the pivot shaft 70 is positioned the front end portion of the associated front shock absorber 13, and the front shock absorber 13 extends, substantially over the full length thereof, along an outer side face of the front portion of the rectangular frame portion 40.

The leading arms 10 each comprise a straight portion 72 formed on the proximal side and extending forward in parallel with the associated side beam 51 while partially overlapping the side beam in plan view. A bent point 73 is located at a nearly middle position. A bent portion 74 is positioned as a front portion with respect to the bent point 73. The bent portion 74 is bent outwardly beyond the side beam 51. Thus, the leading arms 10 are generally doglegged shaped as a whole.

A knuckle portion 75 is attached to the front end of the bent portion 74 and it provides a connection to the associated front wheel 1.

The knuckle portions 75, provided on both right and left sides, are positioned inside the transverse ends of the cross member 41a in plan view and in front of the cross member in side view.

Therefore, tread portions of the right and left front wheels 1 and the cross member 41a are in an overlapped positional relation when seen from the front.

Front joints 77 of tie rods 76 are respectively connected to the rear ends of the knuckle portions 75, and rear joints 78 are connected to a nearly central portion in the transverse direction of a steering gear box 80 at positions close to the center of the vehicle body.

The steering gear box 80 is for supporting a rack and pinion type steering gear mechanism 81. It is disposed to be long in the transverse direction along the front face of the cross member 41a.

The tie rods 76 are provided right and left in a pair so as to open outwardly in a V-shape on the front side as viewed in a plan view. The inclination of the tie rod 76 is approximately the same as the bent portion 74 of each leading arm 10.

As shown in FIG. 1, the back of the shock dispersing plate 55 is brought into abutment with the front end of the resinous floor portion 32 as a constituent of the lower cabin 30.

The operation of this embodiment will now be described. In FIG. 6, the front wheels 1 and leading arms 10 indicated with solid lines are in a normal state. In this state, upon collision of the bumper 53 with any obstacle, the side beams 51 and the center beam 52 transfer the resulting shock to the rectangular frame portion 40.

At this instant, the side beams 51 and the center beam 52 in the shock absorbing portion 50 are of a predetermined length to undergo a plastic deformation so as to be compressed themselves backward, so that their front end positions shift back to provide a long shock absorbing stroke.

Since the shock absorbing portion 50 takes a triangular shape in side view, the aforesaid plastic deformation can be done without vertical bending of the side beams 51 and center beam 52 at the time of absorbing a shock. Consequently, it is possible to ensure a sufficiently long stroke for shock absorption.

Moreover, since it is not necessary for an upper body structure such as the bonnet to be involved with shock absorption, it suffices to take into account only a deformation balance of a reduced number of components, thus facilitating the optimization of the shock absorbing characteristic.

Further, the shock dispersing plate 55 is provided covers the rear end of the center beam 52 and part of the connecting members 54 from the passenger compartment side. The shock dispersing plate 55 is brought into abutment with the front end of the resinous floor 32. Thus, the shock from the shock absorbing portion 50 can be diminished throughout the surface of the shock dispersing plate 55 and transmitted in such a diminished state to the floor portion 32.

Accordingly, shock energy can be absorbed dispersedly by the cabin 5 as a resinous vehicle body.

Additionally, since the leading arms 10 are mounted in an outwardly open condition beforehand, upon application of a shock to the front wheels 1, the leading arms bend and are deformed largely, centered on the bent points 73, and the front wheels 1 escape outwardly so as not to interfere at all with the side beams 51, center beam 52 and the cross member 41a of the rectangular frame portion 40. Thus, plastic deformation in the compressing direction can be continued.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A body frame assembly for a vehicle having a shock absorbing portion projecting forward from a main frame which supports a body of the vehicle, said shock absorbing portion comprising:

a plurality of side beams projecting in a forward direction from a front end of the main frame and being substantially in parallel with each other, said side beams being connected at respective front ends to a common front-end cross member;

a center beam connected at the front end thereof to a substantially central part of said cross member, a rear end of said center beam being located at a higher position than said side beams; and connecting members for connection between said center beam and said side beams;

said shock absorbing portion further including a plate member for covering the rear end of said center beam and part of the connecting members, and a back of said plate member is being in abutment with a vehicle body floor formed of a resin material.

2. The body frame assembly in a vehicle according to claim 1, wherein said connecting members form a U-shape with the opened end of the U-shape being connected to the side beams and the closed end of the U-shape being connected to the center beam.

3. The body frame assembly in a vehicle according to claim 1, wherein said center beam is inclined at an angle from said common front-end cross member to the connecting members.

4. The body frame assembly in a vehicle according to claim 1, wherein said plate member is a shock dispersing plate attached to the rear end of the center beam and the connecting members.

5. The body frame assembly in a vehicle according to claim 4, wherein said shock dispersing plate is in abutment with the resinous floor of the vehicle for diminishing a shock through the surface of the shock dispersing plate and transmitting the shock to the resinous floor portion.

6. The body frame assembly in a vehicle according to claim 1, and further including leading arms mounted at one end to said front end of the main frame and having a wheel mounted to a second end thereof, said leading arms being curved to permit lateral movement of the wheels mounted on the second end of the leading arms when a predetermined shock is applied thereto.

7. The body frame assembly in a vehicle according to claim 1, wherein the plurality of side beams and the center beam are of a predetermined length to provide a shock absorbing stroke.

8. A body frame assembly for a vehicle having a shock absorbing portion projecting forward from a main frame which supports a body of the vehicle, said shock absorbing portion comprising:

- a left side beam and a right side beam projecting in a forward and obliquely upward direction from a front end of the main frame and being substantially in parallel with each other, said left side beam and said right side beam each being connected at respective front ends to a common front-end cross member forming a front bumper;
- a center beam connected at the front end thereof to a substantially central part of said cross member forming the front bumper, a rear end of said center beam being located at a higher position relative to said left and right side beams;
- connecting member for connection between said center beam and said left side beam and said right side beam; and
- a plate member for covering the rear end of said center beam and part of the connecting members, said plate member including a back being in abutment with a vehicle body floor formed of a resin material.

9. The body frame assembly in a vehicle according to claim 8, wherein said connecting members form a U-shape with the opened end of the U-shape being connected to the side beams and the closed end of the U-shape being connected to the center beam.

10. The body frame assembly in a vehicle according to claim 8, wherein said center beam is inclined at an angle from said common front-end cross member to the connecting members.

11. The body frame assembly in a vehicle according to claim 8, wherein said plate member is a shock dispersing plate attached to a connection between the rear end of the center beam and the connecting members.

12. The body frame assembly in a vehicle according to claim 11, wherein said shock dispersing plate is in abutment with the resinous floor of the vehicle for diminishing a shock through the surface of the shock dispersing plate and transmitting the shock to the resinous floor portion.

13. The body frame assembly in a vehicle according to claim 8, and further including leading arms mounted at one end to said front end of the main frame and having a wheel mounted to a second end thereof, said leading arms being curved to permit lateral movement of the wheels mounted on the second end of the leading arms when a predetermined shock is applied thereto.

14. The body frame assembly in a vehicle according to claim 8, wherein the left side beam and the right side beam and the center beam are of a predetermined length to provide a shock absorbing stroke.

* * * * *